Nov. 27, 1951   B. O. FANSLOW   2,576,335
ELECTRIC CORD ADJUSTING REEL
Filed Dec. 10, 1946   3 Sheets-Sheet 1
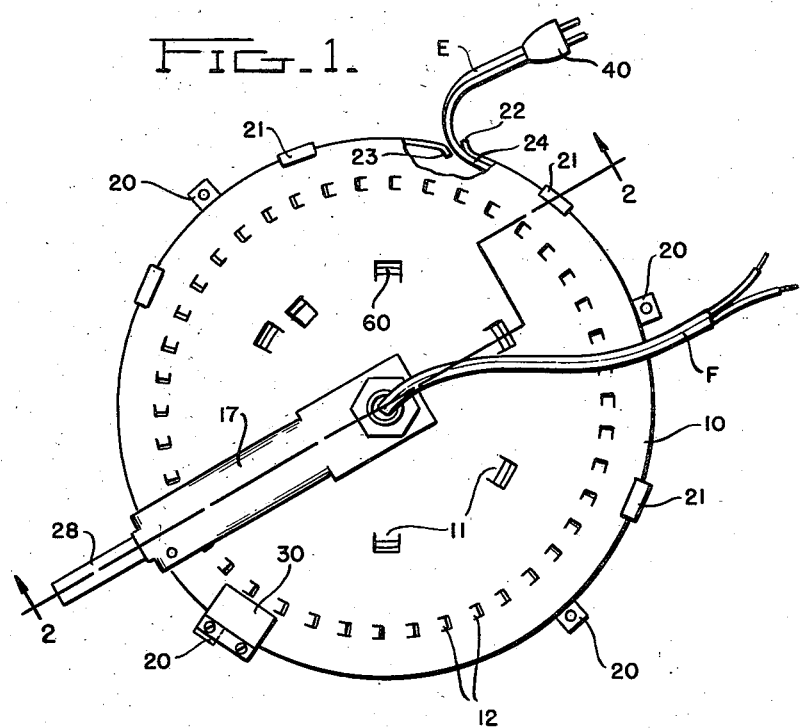
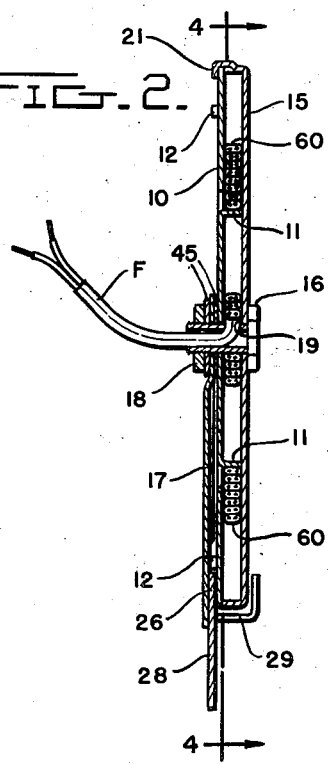
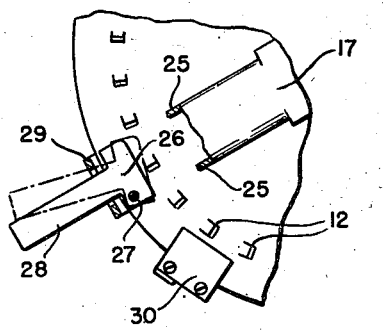
Inventor
BENJAMIN O. FANSLOW
Attorneys Nov. 27, 1951     B. O. FANSLOW     2,576,335
ELECTRIC CORD ADJUSTING REEL
Filed Dec. 10, 1946     3 Sheets-Sheet 2
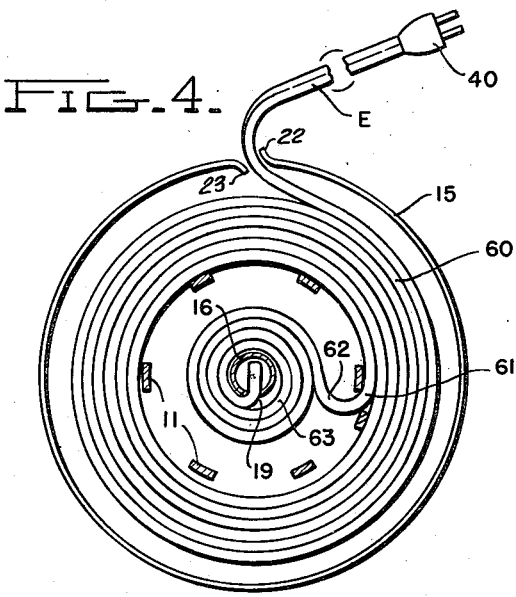
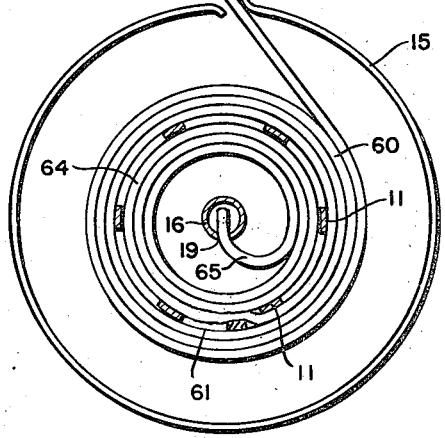
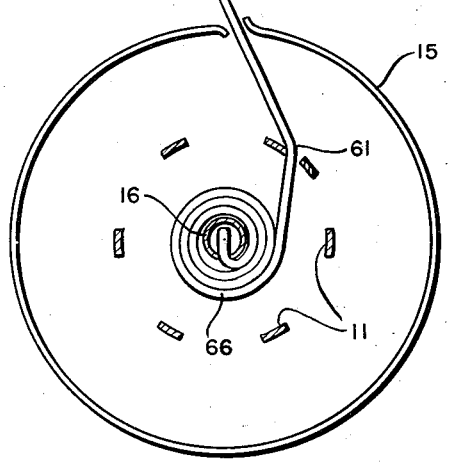
Inventor
BENJAMIN O. FANSLOW
Attorneys Nov. 27, 1951  B. O. FANSLOW  2,576,335
ELECTRIC CORD ADJUSTING REEL
Filed Dec. 10, 1946  3 Sheets-Sheet 3

Inventor
BENJAMIN C. FANSLOW
Attorneys

Patented Nov. 27, 1951

2,576,335

UNITED STATES PATENT OFFICE 2,576,335

ELECTRIC CORD ADJUSTING REEL

Benjamin O. Fanslow, Rockville Centre, N. Y.

Application December 10, 1946, Serial No. 715,185

4 Claims. (Cl. 242—97)

In many instances, it is desirable to have a flexible member of variable length but of inherently non-extensible construction. Thus, with electrical devices, it is common to provide a double-conductor cord leading from the device to a power receptacle. Since the device may be located at arbitrary distances from the receptacle, it is customary to provide a cord or cable which is long enough for the maximum distance; then, when the device is located closer to the receptacle, there is a loose and unused part of the cord which is exposed to collect dust and suffer damage, and which is unattractive in appearance and often dangerous.

The present device is concerned with a reel structure which permits adjustment of the exposed length of a flexible member such as an electric cord, or the like, so that the exposed length can be adjusted to the requirements of a particular employment.

One of the features of the present invention is the provision of a reel comprising two relatively rotatable parts, mounted on a common axis, and providing between them a storage space within which the excess portion of the flexible member can be held, and also providing between them a space for receiving a length of the flexible member which is shorter than that available for external employment; and which permits the relative rotation of the aforesaid two members for the full exposure of the available length of the member, or the total retraction thereof into the reel.

Another feature of the invention is the provision of a reel device having two parts with means for actuating one of the parts relative to the other and thereby provoking the taking up of excess into the reel, said means being manipulatable back and forth in an arcuate path and including elements which produce rotation of said one part in one stroke of the reciprocation, and serving to free and clear the elements during the return stroke, said actuating means including parts whereby a pull along the flexible member, for the purpose of withdrawing it from the reel, is effective to release said actuating means.

A feature of specific construction is the provision of a reel device having a shallow cup and a flat disk closing the mouth of the cup, the disk having a flange extending into the cup space, the cup and disk being relatively rotatable, whereby the flexible member has its ends extending outwardly at the center and through the rim of the cup and has its central part in convolutions inside and outside the flange when fully wound.

With these and other features as objects in view, an illustrative form of construction and employment of the invention is shown on the accompanying drawings, in which Figure 1 is a face view of the device.

Figure 2 is a sectional view through the same substantially on broken line 2—2 of Figure 1, on a somewhat larger scale.

Figure 3 is a view of parts of the actuating means, with parts broken away for clearness.

Figure 4 is a conventionalized diagrammatic view substantially on line 4—4 of Figure 2, on a smaller scale, showing the parts with the cord fully retracted into the reel.

Figures 5 and 6 are views corresponding to that of Figure 4, but respectively showing the position of parts with the cord half-withdrawn from the reel, and with the cord fully withdrawn.

Figure 7:
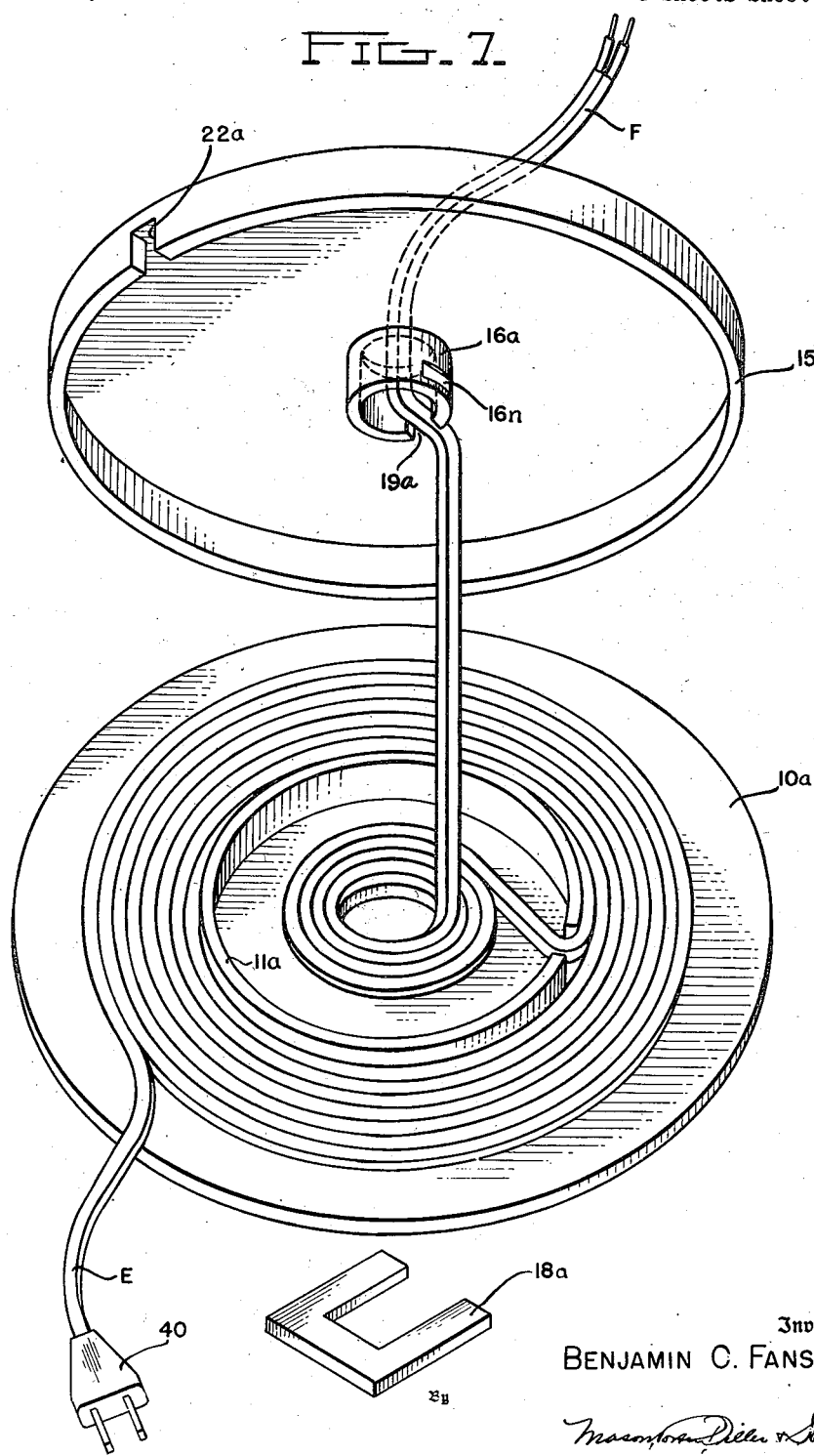
Figure 7 shows a modified construction, in a general perspective view with the parts separated for clearness.

In the illustrated device according to this invention, a disk 10 is provided with inturned tongues or lugs 11 located approximately halfway from the axis to the periphery for providing an apertured cord-receiving flange or sleeve (Fig. 2). The disk 10 likewise has a number of outturned tongues or lugs 12 extending in a concentric circle near the periphery.

A shallow cup 15 is mounted coaxially with the disk 10 on a hollow pivot piece or sleeve 16 which extends through the two members 10, 15 and also through a sweep arm 17, being secured in place by a clamping nut 18 in the illustrated form. This pivot member has a hole 19 opposite the space between the members 10, 15, through which the inner end F of the electric cord extends, so that the cord may be led out at one or the other end of this member 16.

The edge of the cup 15 is of the same diameter as the periphery of the disk 10 for the major portion of its extent, but at spaced points is provided with the apertured lugs 20 by which it may be secured fixedly to a radio cabinet, for example, by the use of screws. The rim of the cup 15 also has a number of lugs 21 which are carried beyond the radial plane of the exposed face of the disk 10 and are then turned inwardly to serve as peripheral retaining means for holding the two elements together. An aperture is provided on the rim of the cup 15 (Figure 1) through which extends the outer end of the electric cord E. As a protection to this cord against damage at a sharp edge as the outermost convolution 24 is being formed or given off, the aperture is preferably formed with its edges provided by the outturned lip 22 opposite the inturned lip 23.

The sweep arm 17 can be rocked about the pivot 16, and has parts of its radial edges turned inwardly to provide stiffening webs 25 which also serve as spacers to permit the location of the rocker 26 between the arm 17 and the exposed face of the disk 10. The rocker 26 is supported on the sweep arm 17 by the pivot 27 and its handle end 28 extends beyond the end of the sweep arm 17 for manual actuation. The end of the sweep arm 17 has the lugs 29 which are turned around the edge of the members 10, 15 (Fig. 2) and over the exposed face of the cup member 15, to assist in holding the sweep arm closely adjacent the two members.

One of the securing lugs 20 of the cup member 15 (Figure 1) is secured to a stop piece 30 which extends over the face of the disk 10 so that it lies in the path of an innermost part of the rocker 26 when the sweep arm 17 is moved in a counter-clockwise direction in Figure 1.

By construction and arrangement, when the rocker 26, 28 is in the full-line position of Figure 3, it is clear of the lugs 12; but when it is brought into the dotted-line position of Figure 3, one slightly rounded corner moves into the zone of these lugs, and upon movement of the sweep arm 17 will engage with a lug 12.

In use, the device may be secured beneath the shelf of a console radio, for example, by the use of screws passing through the lugs 20, with the cup 15 located against the under face of the shelf. The angular position of the device is selected to provide access to the handle 28 of the rocker. The inner end F of the cord is connected electrically to the radio.

The radio which is thus equipped is moved to the desired location in the room, and then the outer end E of the electric cord, shown with the connection piece 40 thereon in Figure 1, is pulled until the desired length of cord is brought out to permit introducing this connection 40 into the wall receptacle. If the rocker 26, 28 is originally in the dotted line position of Figure 3, the pull on the electric cord E acts (with the wire wound as in Figure 1), to cause the disk 10 and the sweep arm 17 to move in a counter-clockwise direction as the cord unwinds, by the engagement of one of the lugs 12 against the inner end of this rocker, until the rocker strikes the releasing stop 30 and therewith the rocker is caused to move in a relative counter-clockwise direction (Figure 3) from the dotted-line into the full-line position, after which the disk 10 is free to continue in its rotation so long as the cord is being drawn out.

Washers 45 can be provided in assembling the pivot 16 with the members 10, 15, 17, and these washers are preferably of dish or spring type, so that a constant friction is being imposed against the free rotation of the disk 10 relative to the cup 15, and of the sweep arm 17 relative to either the disk 10 or cup 15.

In Figures 4, 5 and 6, the behavior of the electric cord is shown diagrammatically. The rim of cup 15 and the pivot piece 16 are assumed to be stationary. The lugs 11 on the disk 10 (this disk 10 being cut away in Figures 4, 5 and 6) turn with the disk. When the cord is fully wound into the reel, Fig. 4, there are a great number of turns 60 of the cord located in the space between the lugs 11 and the outer rim of the cup 15, each of these turns being of relatively large diameter and peripheral length. At a point of the cord near the inner end, the cord passes at part 61 thereof between two of the lugs 11 and forms a bight 62 and then convolutions 63 closely around the pivot 16 for essentially the entire part of its length lying radially inward of the lugs 11, and then extends through the hole 19 in the pivot piece 16, and thence outward through the piece 16. Specifically, the number of convolutions in the inner coil 63 is about half the number of convolutions in the outer coil 60, in the preferred arrangement.

As the outer end E of the cord is pulled away from the reel, the disk 10 with the lugs 11 is caused to rotate, while the rim of the cup 15 and the hollow pivot 16 remain stationary. Thus, it will be noted that the cord is drawn from the reel at an invariable point, and the connection at the inner end of the cord, through the hollow pivot 16, is not subject to torsional twisting.

As the disk 10 turns during the withdrawal of the electric cord, the bight or loop 62 disappears, and the electric cord which has been in the coil 63 now becomes wound, in the reverse direction, against the inner surfaces of the lugs, these convolutions 64 being of shorter peripheral length than the convolutions in the coil 60. When the electric cord has been withdrawn for half of its effective length, for example, the condition of Figure 5 is attained, in which the part of the electric cord located radially inward from the lugs 11 is now wound adjacent the lugs 11 to provide the coil 64, while the coil 63 has disappeared, so to speak, and a bight 65 has appeared adjacent the hole 19.

As further cord is pulled out of the structure, the bight 65 reverses direction, and now the inner portion of the cord begins to unwrap from the coil 64 and to form a new coil 66 around the pivot 16. Ultimately, when the entire available length of cord has been withdrawn, so that the coil 60 has disappeared, the coil 66 has been built up to contain substantially all of the portion of the cord lying inward of the lugs 11. (Figure 6.)

Upon rotating the disk 10 in a clockwise direction (Figures 1, 3, 4, 5 and 6), a reverse action occurs, the coil 60 builds up in proportion as the cord enters the reel, the coil 66 disappears while coil 64 is forming, then the coil 64 disappears while coil 64 is forming, then the coil 64 disappears while the coil 63 is forming, until ultimately the condition of Figure 4 is attained again.

It will be noted that the convolutions are provided by rotation of the disk 10 relative to the cup 15: and that each of the convolutions in coils 63, 64, 66 is smaller than any convolution in the coil 60, and may be only a small fraction of the peripheral length of a convolution in coil 60, so that a very short length of wire within the lugs 61 corresponds to a much greater length outside of these lugs; and furthermore that since the said inner end of the electric cord is successively wound off and on in forming the coils 63, 64, 66, it is only necessary to provide this inner length of wire of a length sufficient to provide half the number of convolutions that are utilized in storing the entire length of the externally available cord, in coil 60, in the wound-up condition of the assembly.

It will be noted that this storing effect can be attained by the simple relative rotation of the disk 10 with regard to the cup 15. When the actuating means of Figure 3 is utilized, the cord can be stored on the reel by engaging the handle 28 and moving it in a relative clockwise direction in Figures 1 and 3. This causes the sweep arm 17 to move away from the actuating stop 30, so that the rocker 26, 28 can move from the full-line position into the dotted-line position, wherewith the rocker comes into the zone of the lugs 12 and will engage with one of these lugs and force the same in a clockwise direction, carrying the disk 10 with it. When the handle 28 has been moved through the desired arc, the operator merely reverses the direction of movement and pushes it in a counter-clockwise direction in Figures 1 and 3 wherewith the rocker 26, 28 moves from the dotted-line into the full-line position and then the rocker is free of the lugs 12, and the sweep arm 17 can be returned toward the actuating stop 30 without any contact occurring with lugs 12.

In the modified form of Fig. 7, the actuator swing arm 17 and associated parts are omitted. The disk 10a and the cup 15a may be formed of transparent plastic. The closing wall or bottom of the cup is integral with the hollow sleeve 16a which has the opening 19a therein; this sleeve having a greater axial dimension than the rim of the cup, so that upon assembly the sleeve extends through the central opening of the disk 10a and therebeyond. Diametrically opposed notches 16n on sleeve 16a can then receive a key 18a which is slid along the exposed face of disk 10a and in the notches 16n to prevent relative axial separating movements of the disk and cup. The rim of the cup 15a has a notch 22a. The disk 10a is formed integrally with the flange or sleeve 11a. The electric cord, shown as a continuous unbroken length from its inner end F to its outer end E with connector 40, is threaded and wound as with the first illustrated form. The inner end F passes through the hole 19a and the sleeve 16a to the exterior: while the outer end E passes through the notch 22a. The operation of the device is the same as previously described: the cup 15a may be held immovable by the fingers of one hand, for example, so that the points 22a, 16a at which the cord enters and leaves the device are immovable; and the disk 10a is rotated by the other hand. The key 18a exerts friction upon the disk 10a to prevent free movement.

In each illustrated form, the electric cord is wound by successive spiral convolutions of inner and outer coils lying in a single plane. Therefore, a very thin and compact assembly is provided, holding a larger available amount of cord, and permitting the collection and withdrawal of this cord without kinking or twisting about the longitudinal axis of the cord. Likewise, in each form the cup 15 or 15a and the disk 10 or 10a provide the opposite exposed faces of the device and thus are externally accessible and are rotatable relative to one another for effecting the "take-up" of the flexible cord into the reel for bringing the assembly into wound-up condition.

It is obvious that the invention may be practiced in many ways within the scope of the appended claims.

I claim:

1. An electric cord package comprising a length of cord and a reel therefor; said reel comprising a hollow pivot piece, a first member fixed to said pivot piece and having a cord outlet guide fixed at its periphery, a second member rotatable relative to said pivot piece, said second member having a lug structure fixed thereon extending towards said first member and providing an annular support between the pivot piece and the outlet guide, said pivot piece having a hole communicating with the space between said members; and an electric cord which has a part located in the pivot piece and in said hole, a part of predetermined length in said space and inside said lugs, and a part passing through the lug structure, and with the major part of said cord extending from said last-named part and to the exterior through said cord outlet guide; said package in wound-up condition having said major part presenting outer convolutions upon said lugs and said part of predetermined length as inner convolutions upon the pivot piece, with said inner and outer convolutions being wound in opposite directions and with the number of said outer convolutions being essentially twice the number of said inner convolutions.

2. An electric cord package comprising a length of cord and a reel therefor; said reel comprising a hollow pivot piece, a first member secured to said pivot piece and having a cord outlet guide at its periphery, a second member rotatable on said pivot piece and having lugs positioned between the pivot piece and the outlet guide and extending towards said first member, means for rotating said second member relative to the first member and the pivot piece, said rotating means comprising second lugs projecting from said second member, a sweep arm pivoted on said pivot piece, a rocker pivoted on the sweep arm and movable between a first position in which it can engage a said second lug and a second position in which it is free of said second lugs, said pivot piece having a hole communicating with the space between said members; and an electric cord which passes into the pivot piece and then through said hole, is wound to form convolutions in said space and between the lugs and pivot piece, and then passes between two of said lugs and in the wound-up condition forms outer convolutions between the lugs and the periphery of said members, and passes through said outlet guide to the exterior from the end of the last of said outer convolutions.

3. An electric cord package comprising a length of cord and a reel therefor; said reel comprising a hollow pivot piece, a first member secured to said pivot piece and having a cord outlet guide at its periphery, a second member rotatable on said pivot piece and having lugs positioned between the pivot piece and the outlet guide and extending therefrom towards said first member, means for rotating said second member relative to the first member and the pivot piece and the outlet guide, said rotating means comprising second lugs projecting from said second member, a sweep arm pivoted on said pivot piece, a rocker pivoted on the sweep arm and movable between a first position in which it can engage a said second lug and a second position in which it is free of said second lugs, and a device attached to said first member for actuating the rocker into said second position when the sweep arm approaches a predetermined point in its movement, said pivot piece having a hole communicating with the space between said members; and an electric cord which passes into the pivot piece and then through said hole, is wound to form convolutions in said space and between the lugs and pivot piece, and then passes between two of said lugs and in the wound-up condition forms outer convolutions between the lugs and the periphery of said members, and passes through said outlet guide to the exterior from the end of the last of said outer convolutions.

4. A reel for flexible materials comprising a hollow pivot piece, a cup member fixedly secured on said pivot piece with its rim wall surrounding at least a part of the hollow pivot piece, and a disk member rotatably mounted on the pivot piece and extending over the mouth of the cup and being spaced from the bottom of the cup, said cup and disk members providing opposite exposed faces of the reel and being externally accessible for effecting relative rotation thereof, said disk member having a sleeve structure fixed to it and extending into the cup member and being located spaced between the pivot piece and the rim wall of the cup member, said pivot piece and cup rim wall having apertures for passage of the flexible material to and from the space between the bottom of the cup member and said disk member, and said sleeve also having an aperture in said space.

BENJAMIN O. FANSLOW.

REFERENCES CITED

The following references are of record in the file of this patent:

UNITED STATES PATENTS

| Number | Name | Date |
|---|---|---|
| 415,897 | Bradner | Nov. 26, 1889 |
| 2,429,675 | Eypper | Oct. 28, 1947 |

FOREIGN PATENTS

| Number | Country | Date |
|---|---|---|
| 184,388 | Switzerland | Aug. 1, 1936 |